United States Patent
Wu et al.

(10) Patent No.: US 11,996,581 B2
(45) Date of Patent: May 28, 2024

(54) BATTERY, ELECTRIC APPARATUS, AND METHOD AND DEVICE FOR PREPARING BATTERY

(71) Applicant: JIANGSU CONTEMPORARY AMPEREX TECHNOLOGY LIMITED, Changzhou (CN)

(72) Inventors: Kai Wu, Changzhou (CN); Haiqi Yang, Changzhou (CN); Xiaoteng Huang, Changzhou (CN); Langchao Hu, Changzhou (CN); Jiarong Hong, Changzhou (CN); Wenli Wang, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 0 days.

(21) Appl. No.: 18/295,151

(22) Filed: Apr. 3, 2023

(65) Prior Publication Data
US 2023/0238646 A1    Jul. 27, 2023

Related U.S. Application Data

(63) Continuation of application No. PCT/CN2020/122000, filed on Oct. 19, 2020.

(51) Int. Cl.
*H01M 50/383* (2021.01)
*H01M 10/6568* (2014.01)
*H01M 50/342* (2021.01)

(52) U.S. Cl.
CPC ..... *H01M 50/383* (2021.01); *H01M 10/6568* (2015.04); *H01M 50/3425* (2021.01)

(58) Field of Classification Search
CPC .......................... H01M 50/383; H01M 50/262
See application file for complete search history.

(56) References Cited

U.S. PATENT DOCUMENTS

| | | | |
|---|---|---|---|
| 2003/0003350 A1 | 1/2003 | Heimer et al. | |
| 2006/0255764 A1* | 11/2006 | Cho | H01M 50/51 320/116 |

(Continued)

FOREIGN PATENT DOCUMENTS

| CN | 1306679 A | 8/2001 |
|---|---|---|
| CN | 205508970 U | 8/2016 |

(Continued)

OTHER PUBLICATIONS

The World Intellectual Property Organization (WIPO) International Search Report and Written Opinion for PCT/CN2020/122000 dated Jul. 20, 2021 16 pages (including translation).

(Continued)

*Primary Examiner* — Amanda J Barrow
(74) *Attorney, Agent, or Firm* — ANOVA LAW GROUP, PLLC

(57) ABSTRACT

This application provides a battery, an electric apparatus, and a method and a device for preparing battery, relating to the field of battery technologies. The battery includes a battery cell having an electrode terminal; a fire prevention pipeline, configured to accommodate a fire prevention medium; and a fastener, configured to fasten the fire prevention pipeline. The fastener is connected to the electrode terminal.

19 Claims, 10 Drawing Sheets

(56) References Cited

U.S. PATENT DOCUMENTS

| | | | |
|---|---|---|---|
| 2010/0136391 | A1 | 6/2010 | Prilutsky et al. |
| 2011/0177382 | A1* | 7/2011 | Kim .................. H01M 10/0413 |
| | | | 429/159 |
| 2012/0114993 | A1* | 5/2012 | Park .................... H01M 50/271 |
| | | | 429/88 |
| 2014/0170447 | A1 | 6/2014 | Woehrle et al. |
| 2014/0242424 | A1 | 8/2014 | Jones |
| 2015/0287963 | A1 | 10/2015 | Chiba |
| 2017/0256764 | A1 | 9/2017 | Li |
| 2018/0138478 | A1 | 5/2018 | Chan |
| 2019/0348649 | A1* | 11/2019 | Ryu .......................... A62C 3/16 |
| 2020/0058967 | A1 | 2/2020 | Berge et al. |
| 2020/0212524 | A1 | 7/2020 | Wang et al. |
| 2020/0212526 | A1 | 7/2020 | Wu et al. |
| 2021/0016668 | A1 | 1/2021 | Nakahara et al. |
| 2021/0075075 | A1 | 3/2021 | Kim et al. |
| 2021/0113871 | A1 | 4/2021 | Huang et al. |
| 2022/0118861 | A1* | 4/2022 | Zeng ...................... A62C 35/10 |
| 2022/0123430 | A1* | 4/2022 | Liang ....................... A62C 3/07 |
| 2022/0311086 | A1* | 9/2022 | Wu ..................... H01M 50/588 |
| 2023/0223650 | A1* | 7/2023 | Zhao ..................... H01M 50/30 |
| | | | 429/72 |

FOREIGN PATENT DOCUMENTS

| | | | | |
|---|---|---|---|---|
| CN | 205542977 | U | | 8/2016 |
| CN | 205583008 | U | | 9/2016 |
| CN | 106356579 | A | | 1/2017 |
| CN | 106450575 | A | | 2/2017 |
| CN | 106785182 | A | | 5/2017 |
| CN | 106960977 | | * 7/2017 | .......... H01M 10/052 |
| CN | 106960977 | A | | 7/2017 |
| CN | 206834290 | U | | 1/2018 |
| CN | 107910606 | A | | 4/2018 |
| CN | 107994175 | A | | 5/2018 |
| CN | 108075086 | A | | 5/2018 |
| CN | 207441811 | U | | 6/2018 |
| CN | 207474504 | U | | 6/2018 |
| CN | 207474524 | U | | 6/2018 |
| CN | 207886552 | U | | 9/2018 |
| CN | 207909930 | U | | 9/2018 |
| CN | 207967074 | U | | 10/2018 |
| CN | 207977389 | U | | 10/2018 |
| CN | 108922998 | A | | 11/2018 |
| CN | 109244349 | A | | 1/2019 |
| CN | 208478517 | U | | 2/2019 |
| CN | 208955153 | U | | 6/2019 |
| CN | 209071461 | U | | 7/2019 |
| CN | 209104233 | U | | 7/2019 |
| CN | 110148694 | | * 8/2019 | .............. H01M 2/12 |
| CN | 110148694 | A | | 8/2019 |
| CN | 209249563 | | * 8/2019 | .............. Y02E 60/10 |
| CN | 209249563 | U | | 8/2019 |
| CN | 110212265 | A | | 9/2019 |
| CN | 209344171 | U | | 9/2019 |
| CN | 209401662 | U | | 9/2019 |
| CN | 209490404 | U | | 10/2019 |
| CN | 110459719 | A | | 11/2019 |
| CN | 209592146 | U | | 11/2019 |
| CN | 209662489 | U | | 11/2019 |
| CN | 209804782 | U | | 12/2019 |
| CN | 110868645 | A | | 3/2020 |
| CN | 110875443 | A | | 3/2020 |
| CN | 210403875 | U | | 4/2020 |
| CN | 111106276 | A | | 5/2020 |
| CN | 210535738 | U | | 5/2020 |
| CN | 210668459 | U | | 6/2020 |
| CN | 210723159 | U | | 6/2020 |
| CN | 211088371 | U | | 7/2020 |
| CN | 111509163 | A | | 8/2020 |
| CN | 111509326 | A | | 8/2020 |
| CN | 111584792 | A | | 8/2020 |
| CN | 111725454 | A | | 9/2020 |
| CN | 111742440 | A | | 10/2020 |
| CN | 211700415 | U | | 10/2020 |
| DE | 102011075318 | A1 | | 11/2012 |
| DE | 102011109249 | A1 | | 2/2013 |
| EP | 3333932 | A1 | | 6/2018 |
| EP | 3940860 | A1 | | 1/2022 |
| JP | H04349342 | A | | 12/1992 |
| JP | H6349521 | A | | 12/1994 |
| JP | 2008251263 | A | | 10/2008 |
| JP | 2010153141 | A | | 7/2010 |
| JP | 2012018766 | A | | 1/2012 |
| JP | 2012094313 | A | | 5/2012 |
| JP | 2014049427 | A | | 3/2014 |
| JP | 2014103051 | A | | 6/2014 |
| JP | 2014110138 | A | | 6/2014 |
| JP | 2015046354 | A | | 3/2015 |
| JP | 2017139099 | A | | 8/2017 |
| JP | 2017147128 | A | | 8/2017 |
| JP | 2017152213 | A | | 8/2017 |
| JP | 2018018753 | A | | 2/2018 |
| JP | 2018045891 | A | | 3/2018 |
| JP | 2018116813 | A | | 7/2018 |
| JP | 201929245 | A | | 2/2019 |
| JP | 2019029245 | A | | 2/2019 |
| JP | 2019149291 | A | | 9/2019 |
| WO | 2005114811 | A2 | | 12/2005 |
| WO | 2013017204 | A1 | | 2/2013 |
| WO | 2020204901 | A1 | | 10/2020 |

OTHER PUBLICATIONS

The China National Intelleectual Property Administration (CNIPA) The First Office Action for 202011121539.5 dated Dec. 7, 2020 16 Pages.

The World Intellectual Property Organization (WIPO) International Search Report and Written Opinion for PCT/CN2020/122001 dated Jul. 22, 2021 14 pages (Including English translation).

The World Intellectual Property Organization (WIPO) International Search Report and Written Opinion for PCT/CN2020/121990 dated Jul. 20, 2021 13 pages (Including English translation).

The World Intellectual Property Organization (WIPO) International Search Report and Written Opinion for PCT/CN2020/121999 dated Jul. 20, 2021 14 pages (Including English translation).

The China National Intellectual Property Administration (CNIPA) First Office Action for CN Application No. 202011121541.1 dated Jun. 14, 2022 24 Pages (Including English translation).

The China National Intellectual Property Administration (CNIPA) First Office Action for CN Application No. 202011120255.3, dated Nov. 23, 2020 15 Pages (Including English translation).

The China National Intellectual Property Administration (CNIPA) First Office Action for CN Application No. 202011120261.9, dated Dec. 8, 2020 31 Pages (Including English translation).

The China National Intellectual Property Administration (CNIPA) Notification to Grant Patent Right for Invention for CN Application No. 202011121540.7, dated Dec. 7, 2020 8 Pages (Including English translation).

The China National Intellectual Property Administration (CNIPA) First Office Action for CN Application No. 202110210133.10 dated Jan. 11, 2022 14 Pages (Including English translation).

The European Patent Office (EPO) The Extended Search Report for EP Application No. 20827955.4, dated Apr. 7, 2022 8 Pages.

The European Patent Office (EPO) The Extended Search Report for EP Application No. 20957981.2, dated Mar. 30, 2023 10 Pages.

The European Patent Office (EPO) The Extended Search Report for EP Application No. 20827972.9, dated Feb. 10, 2022 5 Pages.

The European Patent Office (EPO) Communication under Rule 71(3) for EP Application No. 20827972.9, dated Jul. 28, 2022 58 Pages.

The European Patent Office (EPO) The Extended Search Report for EP Application No. 20957979.6, dated Jul. 24, 2023 9 Pages.

Japan Patent Office (JPO) The Notice of Reasons for Refusal for JP Application No. 2022-544802 dated Sep. 4, 2023 8 Pages (Translation Included).

The United States Patent and Trademark Office (USPTO) Office Action for U.S. Appl. No. 17/138,818, dated Feb. 13, 2023 31 Pages.

(56) References Cited

OTHER PUBLICATIONS

The United States Patent and Trademark Office (USPTO) Notice of Allowance for U.S. Appl. No. 17/138,818, dated Sep. 6, 2023 8 Pages.
The World Intellectual Property Organization (WIPO) International Search Report and Written Opinion for PCT/CN2020/121992 dated Jul. 21, 2021 48 pages (Including English translation).
The European Patent Office (EPO) The Extended European Search Report for 20957980.4 Dec. 11, 2023 9 Pages.
Korean Intellectual Property Office (KIPO) Notice of Allowance for 20237001610 Feb. 7, 2024 5 Pages (including translation).
The Japan Patent Office (JPO) Notification of Reasons for Refusal for Application No. 2023-506304 Feb. 26, 2024 11 Pages (including translation).
The Japan Patent Office (JPO) Decision to Grant a Patent for Application No. 2023-506541 Mar. 4, 2024 7 Pages (including translation).
The Japan Patent Office (JPO) Notification of Reasons for Refusal for Application No. 2023-509570 Mar. 14, 2024 14 Pages(including translation).
United States Patent and Trademark Office (USPTO) Non-final office action for U.S. Appl. No. 18/175,248, filed Mar. 13, 2024 44 Pages.

* cited by examiner

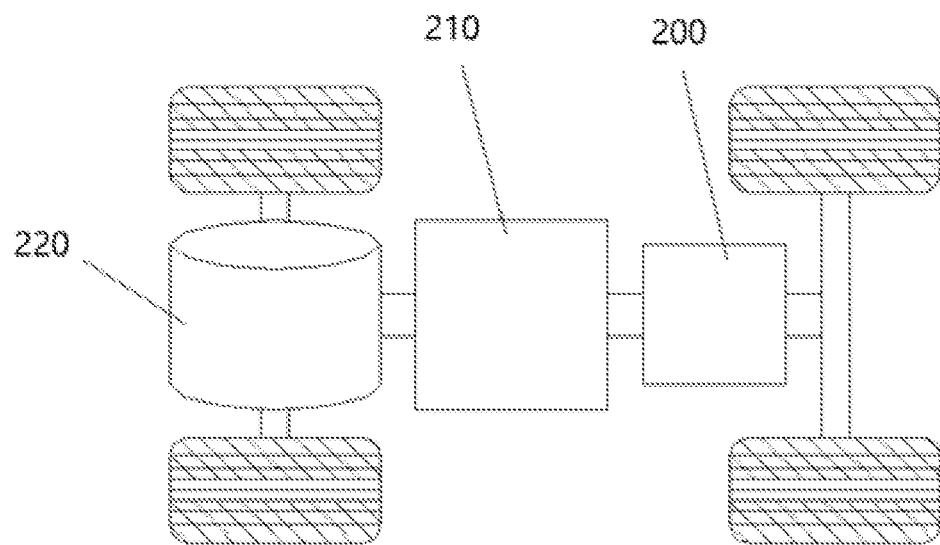
FIG. 1-A
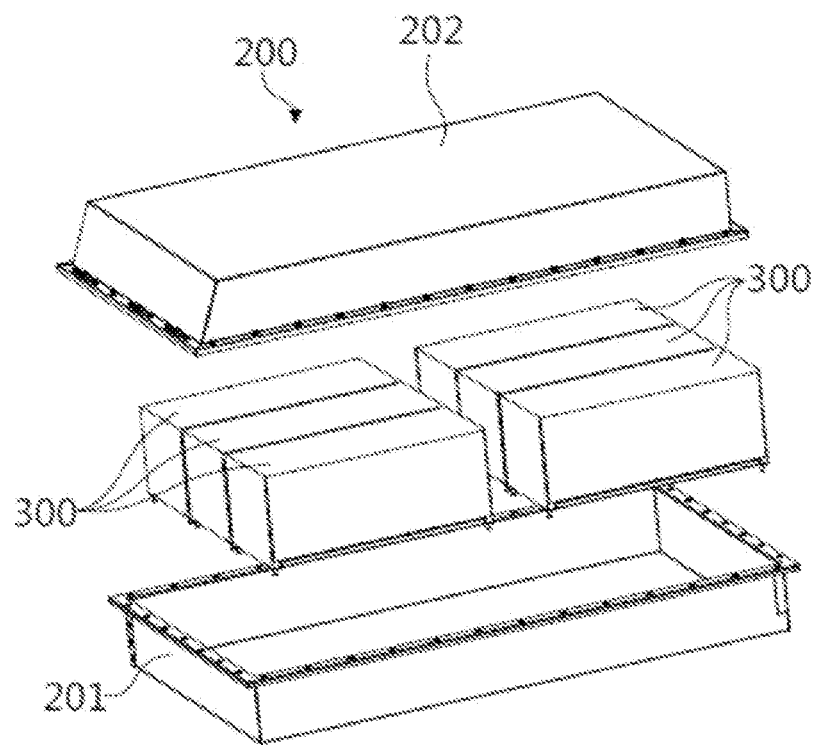
FIG. 1-B

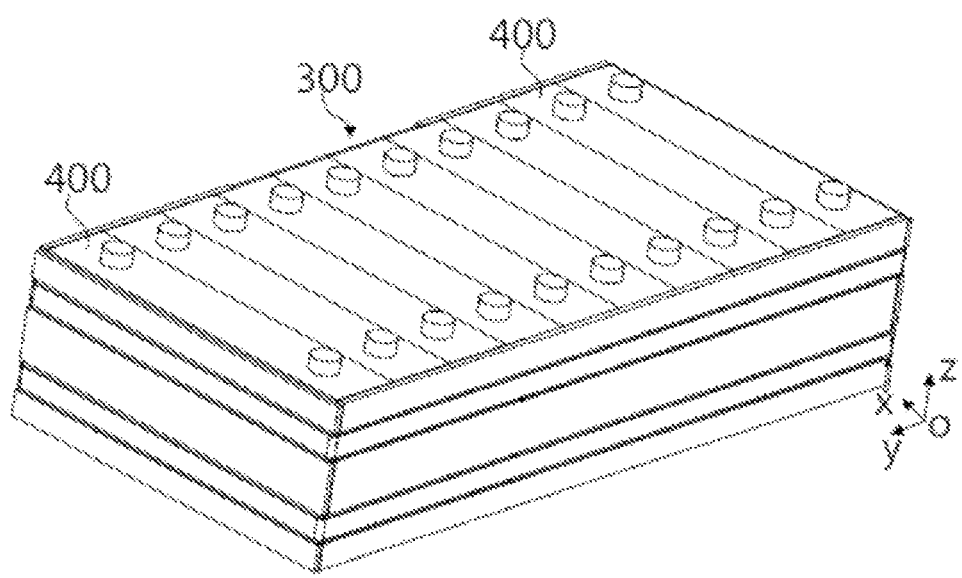
FIG. 1-C

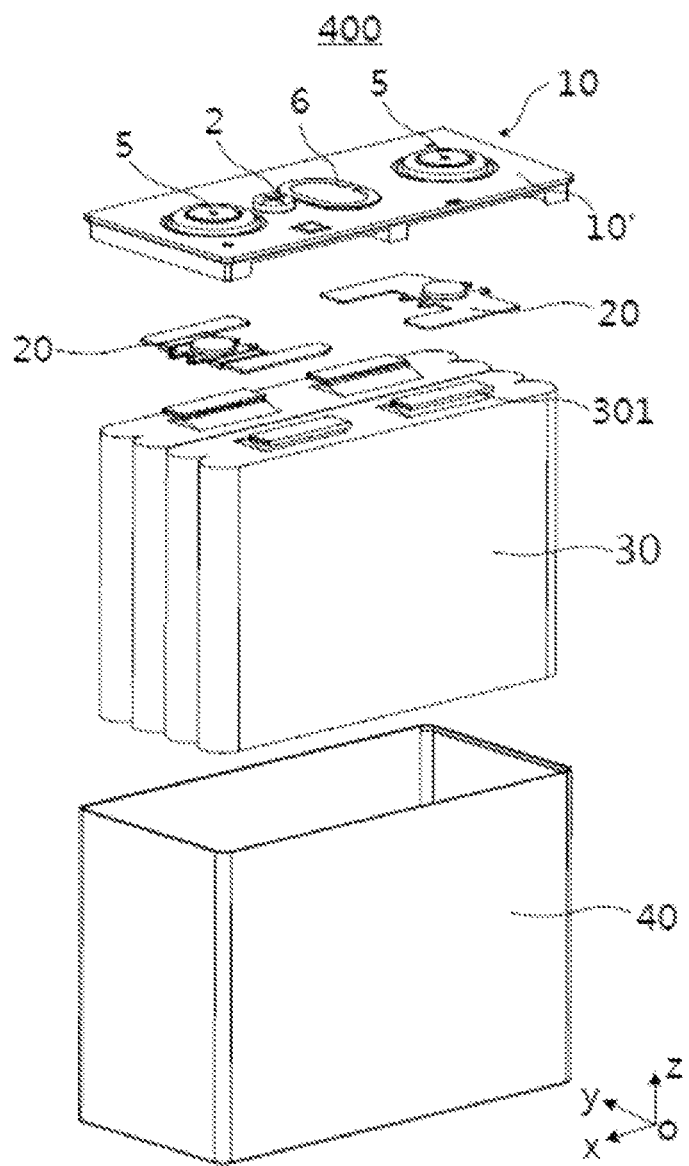
FIG. 1-D

BATTERY, ELECTRIC APPARATUS, AND METHOD AND DEVICE FOR PREPARING BATTERY

CROSS-REFERENCE TO RELATED APPLICATIONS

This application is a continuation application of International Patent Application No. PCT/CN2020/122000, filed on Oct. 19, 2020, which is incorporated herein by reference in its entirety.

TECHNICAL FIELD

This application relates to the field of battery technologies, and in particular, to a battery, an electric apparatus, and a method and a device for preparing battery.

BACKGROUND

Due to the advantages of high energy density, high power density, a large number of charge and discharge cycles, and long storage time, lithium-ion batteries and the like have been widely used in electric vehicles.

However, spontaneous combustion of the battery is the main factor that causes safety accidents of the electric vehicles. In order to prevent spontaneous combustion of the battery, the conventional technology typically uses a fire prevention pipeline. However, how to install the fire prevention pipeline has always been a difficult problem in the industry.

SUMMARY

This application provides a battery, an electric apparatus, and a method and a device for preparing battery, to fasten a fire prevention pipeline to the battery and implement timely fire prevention on a battery cell in thermal runaway to ensure the safe use of the battery.

A first aspect of this application provides a battery, including:
  a battery cell provided with an electrode terminal;
  a fire prevention pipeline configured to accommodate a fire prevention medium; and
  a fastener configured to fasten the fire prevention pipeline, where the fastener is connected to the electrode terminal.

In some embodiments, the fastener includes an accommodating portion, the accommodating portion is configured to accommodate the electrode terminal, and the accommodating portion abuts against the electrode terminal, to limit displacement of the fastener.

In some embodiments, the accommodating portion is constructed to have an opening, so that at least part of the electrode terminal is exposed through the opening.

In some embodiments, the accommodating portion is a through hole that runs through the fastener.

In some embodiments, the fastener further includes a first convex portion, the first convex portion is provided around the periphery of the accommodating portion, and the first convex portion protrudes from the electrode terminal in a direction leaving the battery cell.

In some embodiments, the battery further includes a second convex portion that is provided between the fastener and the battery cell, and elastically abuts against the battery cell, to allow an assembly deviation between the fastener and the battery cell.

In some embodiments, the second convex portion is provided on the fastener and protrudes from a surface of the fastener closer to the battery cell.

In some embodiments, the second convex portion is elastic.

In some embodiments, the fastener further includes an accommodating hole that runs through the fastener. The second convex portion includes a fixed portion and a protruding portion that are connected, where one end of the fixed portion is configured to connect to the protruding portion, and the other end of the fixed portion is configured to connect to part of the wall of the accommodating hole. A gap is present between the protruding portion and other the wall of the accommodating hole, and the protruding portion protrudes from the surface of the fastener closer to the battery cell. When subject to a force in a direction leaving the battery cell, the protruding portion is able to bend with respect to a fixed portion in the direction leaving the battery cell.

In some embodiments, the second convex portion is provided in plurality, and the plurality of second convex portions are arranged in such positions that the fastener and the battery cell are subject to balanced forces when the fastener abuts against the battery cell.

In some embodiments, the battery cell further includes a pressure relief mechanism, and the pressure relief mechanism is configured to be actuated when internal pressure or temperature of the battery cell reaches a threshold, to release the internal pressure;
  the fire prevention pipeline is configured to discharge the fire prevention medium toward the battery cell when the pressure relief mechanism is actuated; and
  the fastener has a first weak zone, and the first weak zone is configured to allow the fire prevention medium to flow through the first weak zone to the battery cell when the pressure relief mechanism is actuated.

In some embodiments, the first weak zone is provided as a through hole; or the first weak zone is configured to be destroyed to form a through hole when the pressure relief mechanism is actuated.

In some embodiments, a projected area of the fire prevention pipeline on the pressure relief mechanism is smaller than an area of the pressure relief mechanism.

In some embodiments, the fastener further includes a buckle. The buckle is configured to fasten the fire prevention pipeline to the fastener, and the buckle is provided on two sides of the first weak zone along a central axis of the fire prevention pipeline.

In some embodiments, the fastener further includes a first depression, configured to accommodate at least part of the fire prevention pipeline, and the first weak zone and the buckle are both provided in the first depression.

In some embodiments, the battery further includes a separation part, configured for installing a busbar. The busbar is connected to the electrode terminal, and the fastener is located between the separation part and the battery cell, to limit displacement of the fastener.

In some embodiments, the separation part includes a second weak zone, configured to allow emissions from the battery cell to pass through the second weak zone and destroy the fire prevention pipeline when the pressure relief mechanism is actuated.

In some embodiments, the fire prevention pipeline is bonded to the separation part.

In some embodiments, a protection part is further included, configured to connect to the separation part;

the protection part includes a third weak zone, and the third weak zone is configured to allow the emissions from the battery cell to pass through the third weak zone and destroy the fire prevention pipeline when the pressure relief mechanism is actuated.

In some embodiments, the fire prevention pipeline is bonded to the protection part.

In some embodiments, positions at which glue is applied bypasses the third weak zone when the fire prevention pipeline is being bonded to the protection part.

According to another aspect of the embodiments of this application, an electric apparatus is provided, including the battery described above, where the battery is configured to supply electrical energy.

According to another aspect of the embodiments of this application, a method for preparing battery is provided, including the following steps:
- installing a battery cell, where the battery cell is provided with an electrode terminal;
- installing a fastener and connecting the fastener to the electrode terminal; and
- installing a fire prevention pipeline and fastening the fire prevention pipeline to the fastener, where the fire prevention pipeline is configured to accommodate a fire prevention medium.

According to another aspect of the embodiments of this application, a device for preparing battery is provided, including:
- a battery cell installation apparatus, configured to install a battery cell, where the battery cell is provided with an electrode terminal;
- a fastener installation apparatus, configured to install a fastener and connect the fastener to the electrode terminal; and
- a fire prevention pipeline installation apparatus, configured to install a fire prevention pipeline to the fastener, and the fire prevention pipeline is configured to accommodate a fire prevention medium.

In the embodiments of this application, the fastener is provided to fasten the fire prevention pipeline to the electrode terminal reliably, so that the fire prevention pipeline can implement timely fire prevention on the battery cell, to ensure the safe use of the battery.

BRIEF DESCRIPTION OF DRAWINGS

To describe the technical solutions in the embodiments of this application or in the prior art more clearly, the following briefly describes the accompanying drawings for describing the embodiments or the prior art. Apparently, the accompanying drawings in the following description show some embodiments of this application, and a person of ordinary skill in the art may still derive other drawings from these accompanying drawings without creative efforts.

The drawings described herein are intended for a further understanding of this application and constitute a part of this application. Example embodiments of this application and descriptions thereof are intended to explain this application, and do not constitute any inappropriate limitation on this application.

FIG. 1-A is a schematic structural diagram of an electric apparatus according to some embodiments of this application.

FIG. 1-B is a schematic structural diagram of a battery according to some embodiments of this application.

FIG. 1-C is a schematic structural diagram of a battery module in a battery according to some embodiments of this application.

FIG. 1-D is a schematic structural diagram of battery cells in a battery module according to some embodiments of this application.

Figure 2:
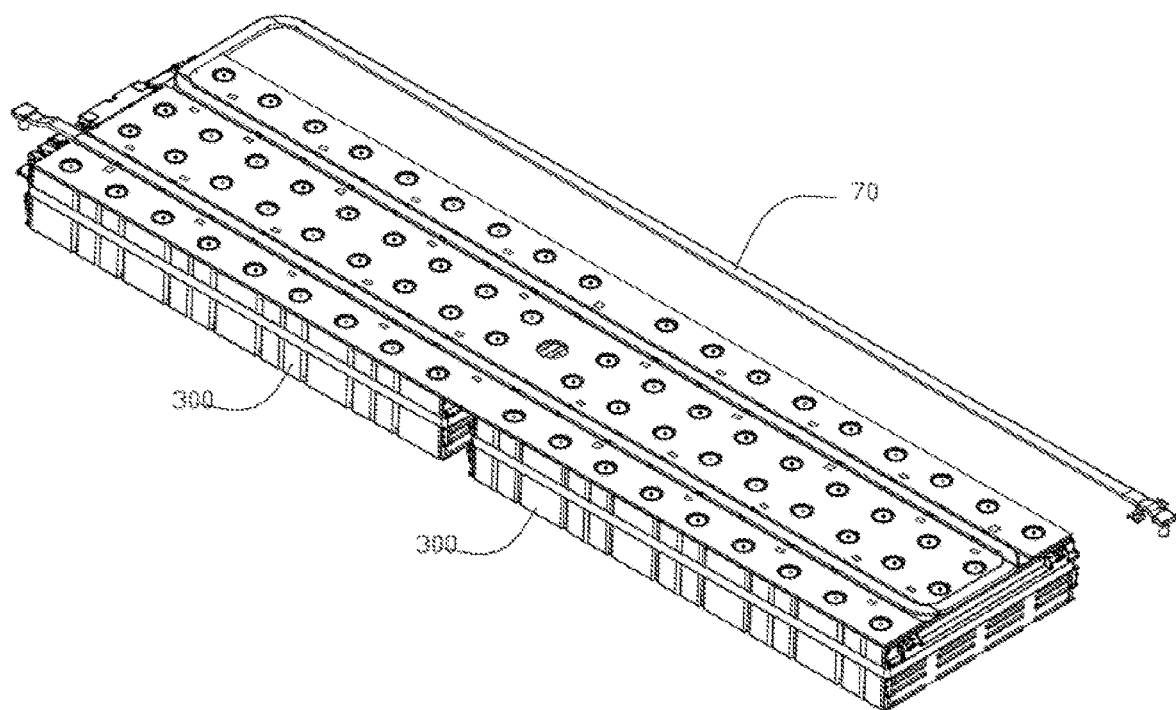
FIG. 2 is a schematic structural diagram of a fire prevention pipeline provided on a battery according to an embodiment of this application.
Figure 3:
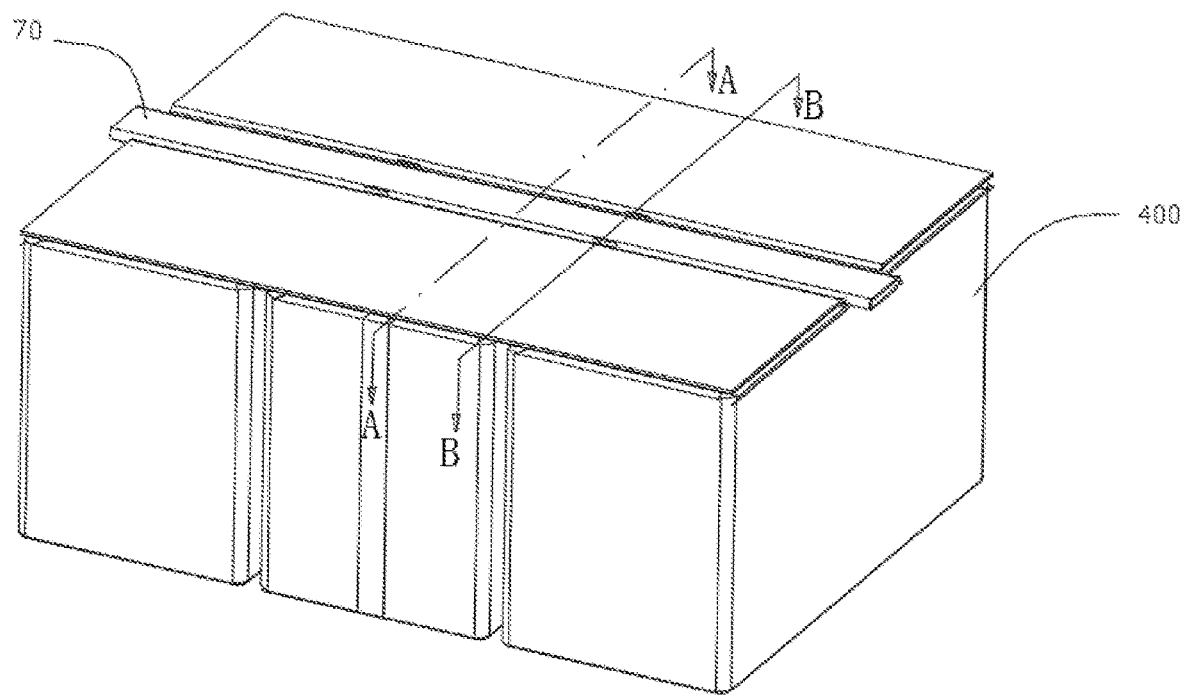
FIG. 3 is a partially enlarged view of a battery module in an embodiment.

Reference signs are described as follows:
- 200. battery; 210. controller; 220. motor; 201. first housing; 202. second housing;
- 300. battery module; 400. battery cell; 40. housing; 30. electrode assembly;
- 10. end cover assembly; 10'. end cover plate; 20. connecting member;
- 5. electrode terminal; 301. tab; 6. pressure relief mechanism; 2. injection member; 70. fire prevention pipeline;
- 80. fastener; 81. main body; 82. connecting portion; 821. through hole; 822. first convex portion; 823. second convex portion; 824. accommodating hole; 811. first weak zone; 812. buckle; 814. stiffener structure;
- 91. busbar;
- 92. separation part; 921. second weak zone; 922. second depression;
- 93. protection part; 931. third weak zone; 932. third depression;
- 500. device for preparing battery; 510. battery cell installation apparatus; 520. fastener installation apparatus; 530. fire prevention pipeline installation apparatus.

DETAILED DESCRIPTION OF EMBODIMENTS

To make the objectives, technical solutions, and advantages of this application more comprehensible, the following describes this application in detail with reference to embodiments and accompanying drawings. It should be understood that the specific embodiments described herein are only used to explain the application, and are preferred embodiments of this application, and are not intended to limit the scope of protection of this application. Any equivalent changes made in accordance with the structure, shape, and principle of this application shall fall within the protection scope of this application.

Unless otherwise defined, all technical and scientific terms used herein shall have the same meanings as commonly understood by those skilled in the art to which this application belongs. The terms used in the specification of this application are merely intended to describe the specific embodiments but not intended to constitute any limitation on this application. The terms "including" and "having" and any other variations thereof in the specification, the claims and the brief description of drawings of this application are intended to cover but not exclude other content.

The term "embodiment" described herein means that specific features, structures or characteristics in combination with descriptions of the embodiments may be incorporated in at least one embodiment of this application. The term "embodiment" in various positions in the specification does not necessarily refer to a same embodiment, or an independent or alternative embodiment that is exclusive of other embodiments. Persons skilled in the art explicitly and implicitly understand that the embodiments described herein may combine with another embodiments.

The term "and/or" in this specification is only an associative relationship for describing associated objects, indicating that three relationships may exist. For example, A and/or B may indicate three scenarios: A alone; A and B; and B alone. In addition, a character "/" in this specification generally indicates an "or" relationship between contextually associated objects.

In addition, the terms "first", "second" and the like in the specification and the claims or the above accompanying drawings of this application are used to distinguish between different objects but not describe a specific sequence, and can explicitly or implicitly include one or more features.

In the descriptions of this application, unless otherwise specified, "plurality" means more than two (including two). Likewise, "a plurality of groups" means more than two groups (including two groups).

In the descriptions of this application, it should be noted that, unless otherwise specified and defined explicitly, the terms such as "installed", "connected" and "connection" should be understood broadly. For example, "connected" or "connection" of a mechanical structure may indicate physical connection. For example, the physical connection may be fixed connection, for example, fixed connection by using a fastener such as a screw, a bolt or other fasteners; or the physical connection may be detachable connection, for example, connection by mutual clamping or clamping; or the physical connection may be an integral connection, for example, connection by welding, bonding or integral forming. "Connected" or "connection" of a circuit structure may indicate physical connection, and may also indicate electrical connection or signal connection, for example, may be direct connection, that is, the physical connection, may be indirect connection by using at least one element in between as long as circuit communication is implemented, and may also be communication between two elements; and the signal connection may be signal connection by using a circuit, and may also be signal connection by using a media medium, such as a radio wave. A person of ordinary skill in the art may understand specific meanings of the preceding terms in the embodiments of this application based on a specific situation.

In order to clearly describe each direction in the following embodiments, some directional terms may be used. For example, the coordinate system in FIG. 1-D defines the directions of the battery. The direction x represents a length direction of the battery cell 400, the direction y is perpendicular to the direction x in a horizontal plane, and represents a width direction of the battery cell 400, and the direction z is perpendicular to the direction x and the direction y, and represents a height direction of the battery. In addition, the foregoing expressions such as directions x, y and z that are used to describe indicated directions of operations and constructions of various members of the battery in the embodiments are relative rather than absolute. Although these indications are appropriate when the members of the battery are located at the positions shown in the drawings, these directions shall be interpreted differently when the positions change, to reflect the changes.

Based on the same understanding of directions, in the descriptions of this application, the directions or positional relationships indicated by the terms "center", "vertical", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the directions or positional relationships shown in the accompanying drawings, are merely intended to facilitate the descriptions of this application and simplify the descriptions, are not intended to indicate or imply that the apparatuses or components mentioned in this application must have specific directions, or be constructed and operated in a specific direction, and therefore shall not be construed as a limitation to this application.

A rechargeable battery may be referred to as a secondary battery or a traction battery. At present, the most widely used rechargeable battery is lithium battery, for example, a lithium-sulfur battery, a sodium lithium-ion battery, or a magnesium-ion battery, which is not limited. For the convenience of description, rechargeable batteries may be collectively referred to as batteries in this specification.

Safety of a battery is an important characteristic for measuring battery performance. It is necessary to ensure the safety of the battery as much as possible when using or charging.

The battery typically includes a plurality of battery cells that are connected. When a battery cell experiences an external short circuit, overcharge, needle puncture, plate impact, and the like, the battery cell is prone to thermal runaway. In the case of thermal runaway of the battery, emissions will be generated inside the battery cell, including but not limited to electrolyte, fragments of positive and negative electrode plates and separator because of dissolution or breaking, high-temperature and high-pressure gas and flames generated by reactions, and the like. These emissions may have thermal diffusion in the process of emission, resulting in thermal runaway of other battery cells, and even explosion and other accidents.

Regarding thermal runaway of the battery cell, an existing effective solution is to provide a fire prevention pipeline. To be specific, when the battery cell experiences thermal runaway, a fire prevention pipeline is used to prevent or delay explosion or fire of the battery cell. The fire prevention pipeline is typically provided in the box body. When the battery cell experiences thermal runaway, the fire prevention pipeline releases a fire prevention medium to implement fire prevention. However, the inventors have found that although the fire prevention pipeline is provided, a battery using the fire prevention pipeline mentioned above still cannot implement timely fire prevention in the case of thermal runaway of the battery. In view of the foregoing problem, the inventors have tried to change the position of the fire prevention pipeline and the fire prevention manner, but none of them can solve the foregoing problem. After long term research, the inventors have further discovered that the battery provided with the fire prevention pipeline still had a safety risk because the fire prevention pipeline was displaced in the process of thermal runaway of the battery, so that the fire prevention pipeline was unable to implement timely fire prevention on the part that experiences thermal runaway. In other words, the fire prevention pipeline was not fastened reliably.

In view of this, this application is intended to provide a battery, where an electrode terminal is connected to a fastener, to fasten the fastener to a battery cell, and a fire prevention pipeline is fastened by using the fastener. The problem of untimely fire prevention caused by displacement of the fire prevention pipeline in the process of thermal runaway of the battery in the prior art may be overcome.

The battery in the embodiments of this application may be applied to various electric apparatuses that use electrical energy as power. The electric apparatuses herein may be, but are not limited to, electric cars, electric trains, electric bicycles, golf carts, drones, ships, and the like. In addition, the electric apparatuses may be apparatuses that use only batteries to supply power, or may be hybrid electric apparatuses. The battery supplies electrical energy to the electric apparatus, and the electric apparatus is driven by a motor.

For example, FIG. 1-A is a schematic structural diagram of an electric apparatus according to an embodiment of the application, where the electric apparatus may be a vehicle. The vehicle may be a fossil fuel vehicle, a natural gas vehicle, or a new energy vehicle. The new energy vehicle may be a battery electric vehicle, a hybrid electric vehicle, a range-extended vehicle, or the like. The vehicle includes a battery 200, a controller 210, and a motor 220. The battery 200 is configured to supply electricity to the controller 210 and the motor 220 as an operating power source and a driving power source of the vehicle. For example, the battery 200 is configured to satisfy the need for electricity during start, navigation, and operation of the vehicle. For example, the battery 200 supplies electricity to the controller 210, and the controller 210 controls the battery 200 to supply electricity to the motor 220. The motor 220 receives and uses the electricity from the battery 200 as a driving power source of the vehicle, to replace or partially replace fuel or natural gas as a driving power of the vehicle.

In order to implement a higher performance for the battery to meet usage needs, the battery 200 may include a plurality of battery modules that are connected to each other. As shown in FIG. 1-B, the battery 200 includes a first housing 201, a second housing 202, and a plurality of battery modules 300, where the first housing 201 and the second housing 202 are buckled to each other, and a plurality of battery modules 300 are arranged in a space enclosed by the first housing 201 and the second housing 202.

As shown in FIG. 1-C, a battery module 300 includes a plurality of battery cells 400, and the plurality of battery cells 400 may be connected in series, in parallel, or in hybrid connection mode to achieve a larger current or voltage. The hybrid connection means a combination of series connection and parallel connection. For example, as shown in FIG. 1-C, the battery cell 400 may be placed upright, a height direction of the battery cell 400 is consistent with the vertical direction, and a plurality of battery cells 400 are arranged side by side in a width direction; or the battery cell 400 may be placed flat, the width direction of the battery cell 400 is consistent with the vertical direction, a plurality of battery cells 400 may be stacked in at least one layer in the width direction, and each layer includes a plurality of battery cells 400 that are arranged and spaced apart in a length direction.

To enable a person skilled in the art to clearly understand the improvements in this application, the overall structure of the battery cell 400 is first described.

As shown in FIG. 1-D, the battery cell 400 includes a housing 40, an electrode assembly 30, and an end cover assembly 10. The end cover assembly 10 includes an end cover plate 10', and the end cover plate 10' is connected to the housing 40 (for example, by welding), to form an enclosure of the battery cell 400. The electrode assembly 30 is provided in the housing 40, and the housing 40 is filled with electrolyte. The battery cell 400 may be cube-shaped, cuboid-shaped or cylinder-shaped.

According to actual usage needs, one or more electrode assemblies 30 may be configured. As shown in FIG. 1-D, at least two separate wound electrode assemblies 30 may alternatively be provided in the battery. A main body portion of the electrode assembly 30 may be formed by stacking or winding a first electrode plate, a second electrode plate, and a separator located between the first electrode plate and the second electrode plate that are arranged adjacently, where the separator is an insulator sandwiched between the first electrode plate and the second electrode plate. The main body portion has two opposite end surfaces. In this embodiment, for example, the first electrode plate is a positive electrode plate and the second electrode plate is a negative electrode plate. A positive electrode active substance is coated on a coating zone of the positive electrode plate, and the negative electrode active substance is coated on the coating zone of the negative electrode plate. A plurality of uncoated zones extending from a coating zone of the main body portion are stacked as tabs. The electrode assembly includes two tabs 301: a positive tab and a negative tab. The positive tab extends from a coating zone of the positive electrode plate, and the negative tab extends from a coating zone of the negative electrode plate.

The end cover assembly 10 is provided on the top of the electrode assembly 30. As shown in FIG. 1-D, the end cover assembly 10 includes an end cover plate 10' and two electrode terminals 5, where two electrode terminals 5 are a positive electrode terminal and a negative electrode terminal. Each electrode terminal 5 is provided with a connecting member 20 correspondingly, and the connecting member 20 is located between the end cover plate 10' and the electrode assembly 30.

For example, in FIG. 1-D, the tabs 301 of the electrode assembly 30 are located at the top, the positive tab is connected to the positive electrode terminal by using a connecting member 20, and the negative tab is connected to the negative electrode terminal by using another connecting member 20. For example, the battery cell 400 may include two end cover assemblies 10 that are provided at two ends of the housing 40 respectively, and each end cover assembly 10 is provided with one electrode terminal 5.

The end cover plate 10' may further be provided with an explosion-proof member, to release gas in the battery cell 400 in a timely manner when there is too much gas in the battery cell 400, to avoid explosion.

The end cover plate 10' is provided with an exhaust hole, and the exhaust hole may be provided in a middle position of the end cover plate 10' in the length direction. The explosion-proof member includes a pressure relief mechanism 6, and the pressure relief mechanism 6 is provided on the exhaust hole. In a normal state, the pressure relief mechanism 6 is sealed and installed on the exhaust hole. When the battery swells, and the air pressure in the enclosure rises beyond a preset value, the pressure relief mechanism 6 is actuated to open, and the gas is released outward through the pressure relief mechanism 6.

The pressure relief mechanism 6 is a component or a part that can be actuated when internal pressure or internal temperature of the battery cell 400 reaches a preset threshold, to release the internal pressure and/or internal substances. The pressure relief mechanism 6 may be specifically in a form of an explosion-proof valve, a gas valve, a relief valve, a safety valve, or the like, and may specifically use a pressure-sensitive or temperature-sensitive component or structure. To be specific, when internal pressure or temperature of the battery cell 400 reaches a preset threshold, the pressure relief mechanism 6 performs an action or a weak structure provided in the pressure relief mechanism 6 is destroyed, to form an opening or a channel for internal pressure relief. The threshold in this application may be a pressure threshold or a temperature threshold. The design of the threshold varies according to different design requirements. For example, the threshold may be designed or determined according to the internal pressure or internal temperature value of the battery cell 400 that is considered to be dangerous or at risk of being out of control. In addition, the threshold may be determined by materials used in one or more of the positive electrode plate, negative electrode plate, electrolyte, and separator in the battery cell 400.

The "actuation" mentioned in this application means that the pressure relief mechanism 6 performs an action or is activated to be in a specific state, so that the internal pressure of the battery cell 400 can be released. The actions performed by the pressure relief mechanism 6 may include but are not limited to: cracking, breaking, tearing, or opening at least part of the pressure relief mechanism 6. When the pressure relief mechanism 6 is actuated, high-temperature and high-pressure substances inside the battery cell 400 are discharged from the actuated part as emissions. In this way, the pressure of the battery cell 400 can be released under the condition that the pressure or temperature is controllable, to avoid more serious potential accidents. The emissions from the battery cell 400 mentioned in this application include but are not limited to electrolyte, fragments of positive and negative electrode plates and separator because of dissolution or breaking, high-temperature and high-pressure gas and flames generated by reactions, and the like. The high-temperature and high-pressure emissions are discharged toward the direction in which the pressure relief mechanism 6 is provided on the battery cell 400, and more specifically, can be discharged in the direction toward the area in which the pressure relief mechanism 6 is actuated. The force and destructive power of such emissions may be enormous, or even great enough to break through one or more structures such as a cover in that direction.

In some embodiments, as shown in FIG. 1-D, the end cover plate 10' is provided with a through hole that is configured to inject electrolyte into the battery cell 400. The through hole may be a circular hole, an elliptical hole, a polygonal hole, or a hole of other shapes, and may extend in a height direction of the end cover plate 10'. The end cover plate 10' is provided with an injection member 2 to close the through hole.

FIG. 2 to FIG. 9 are schematic structural diagrams of fastening a fire prevention pipeline on a battery in an embodiment of this application.

The fire prevention pipeline in the embodiments of this application is configured to accommodate a fire prevention medium, where the fire prevention medium may be fluid, and the fluid may be liquid or gas. In a case that the pressure relief mechanism does not destroy the fire prevention pipeline, the fire prevention pipeline may not accommodate any substance. In a case that the pressure relief mechanism is actuated, the fire prevention pipeline may accommodate the fire prevention medium. For example, the fire prevention medium may be controlled to enter the fire prevention pipeline by opening and closing a valve. Alternatively, in a case that the pressure relief mechanism is not destroyed, the fire prevention pipeline may always accommodate the fire prevention medium, and the fire prevention medium may alternatively be configured to regulate temperature of the battery cell. Regulating temperature means heating or cooling a plurality of battery cells. In the case of cooling the battery cells, the fire prevention pipeline is configured to accommodate cooling fluid, to lower temperature of the plurality of battery cells. In this case, the fire prevention pipeline may also be referred to as a cooling part, a cooling system, or a cooling pipeline. The fire prevention medium accommodated by the fire prevention pipeline may also be referred to as a cooling medium or cooling fluid, and more specifically, may be referred to as a coolant or cooling gas. Optionally, the fire prevention medium may circulate, to achieve a better temperature regulation effect. Optionally, the fire prevention medium may be water, a mixture of water and ethylene glycol, air, or the like.

Referring to FIG. 2 to FIG. 6, a fastener 80 is provided on the battery cell 400. The fastener 80 is connected to the electrode terminal 5 of the battery cell 400. A fire prevention pipeline 70 is fastened to the fastener 80, so as to fasten the fire prevention pipeline 70 to the battery cell 400, where the fire prevention pipeline 80 is configured to accommodate a fire prevention medium.

In this application, the fire prevention pipeline 70 is fastened to the electrode terminal 5. On the one hand, the fastening method of the fire prevention pipeline 70 is simplified, and fastening the fire prevention pipeline 70 becomes easier; on the other hand, the fire prevention pipeline can be fastened properly, to avoid displacement of the fire prevention pipeline in the process of thermal runaway of the battery to cause untimely fire prevention.

Figure 6:
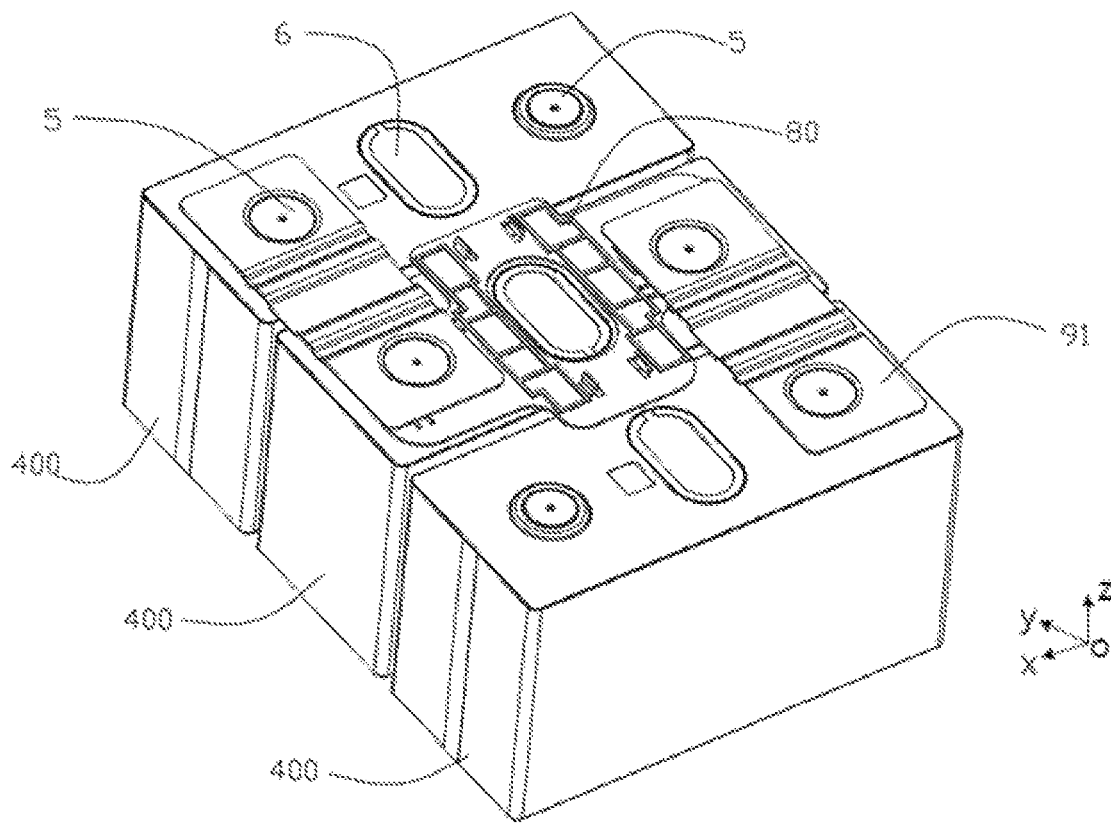
FIG. 6 is a schematic diagram of connection between a fastener and a battery cell in an embodiment.

FIG. 6 is a schematic diagram of connection between the fastener 80 and the battery cell 400 in this embodiment.

The fastener 80 is provided with an accommodating portion, configured to accommodate the electrode terminal 5 of the battery cell 400. The accommodating portion abuts against the electrode terminal 5 to limit displacement of the fastener 80.

In a feasible implementation, the accommodating portion may alternatively be constructed to have an opening through which at least part of the electrode terminal 5 is exposed.

A busbar 91 is configured to electrically connect to the battery cell 400, and the busbar 91 is connected to the electrode terminal 5 through the opening of the accommodating portion to limit the movement of the fastener 80 in the direction z.

In a feasible implementation, the busbar 91 may be fastened to the electrode terminal 5 by welding.

Using the above structure, the fastener 80 cooperates with the electrode terminal 5 by using the accommodating portion. Therefore, the fastener 80 is unable to move in the direction x and the direction y. The busbar 91 is provided above the fastener 80, so that the fastener 80 cannot move in the direction z. The electrode terminal 5 and the busbar 91 work together, so that the fastener 80 is always fastened above the pressure relief mechanism 6 of the battery cell 400, to completely restrict the position of the fire prevention pipeline and realize the fixation of the relative position of the fire prevention pipeline to the pressure relief mechanism 6.

Figure 7:
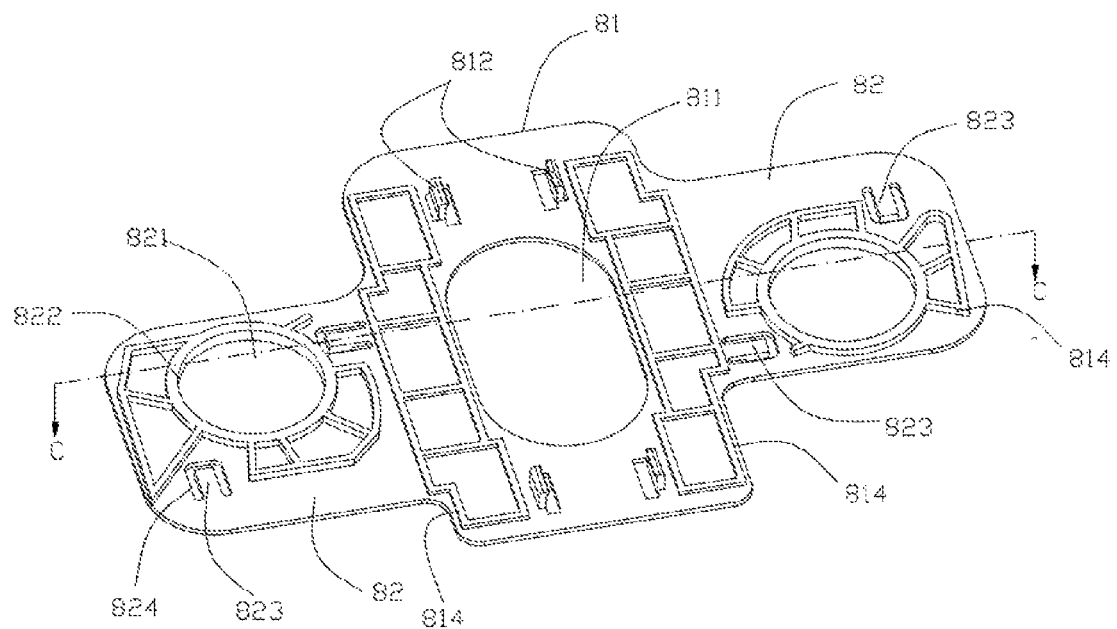
FIG. 7 is a schematic structural diagram of a fastener in an embodiment.
Figure 8:
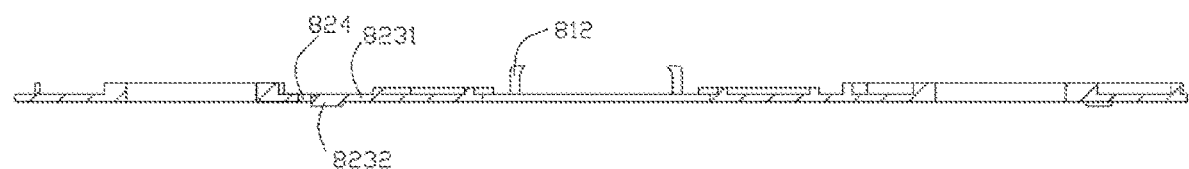
FIG. 8 is a cross-sectional view taken along the line C to C in FIG. 7.
Figure 9:
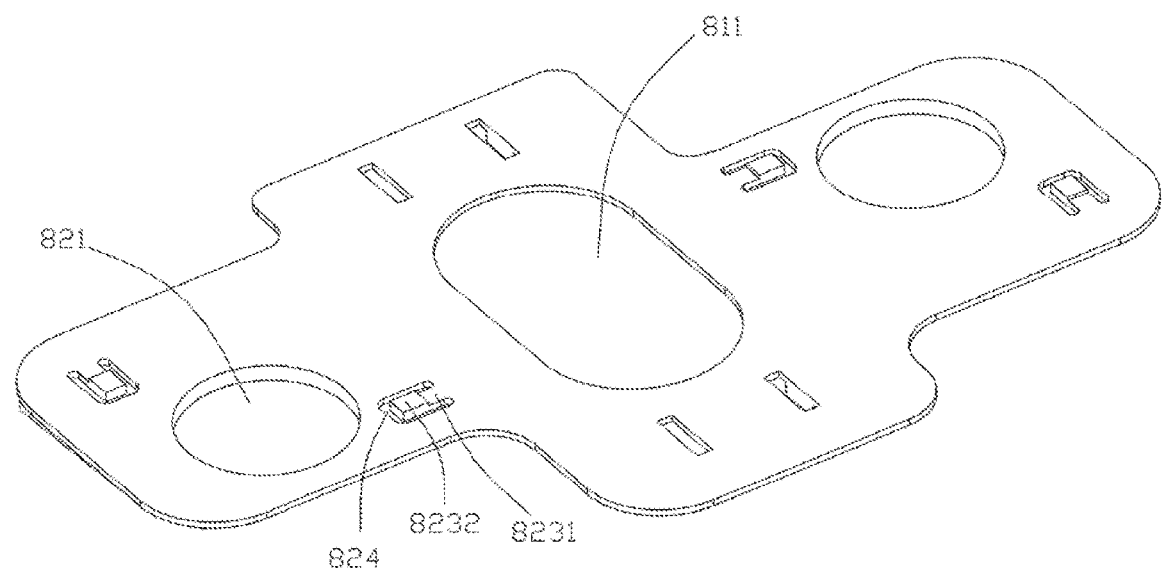
FIG. 9 is a bottom view of FIG. 7.

FIG. 7 to FIG. 9 are schematic structural diagrams of a fastener 80 in some embodiments.

The fastener 80 includes a main body 81 and a connecting portion 82 that is arranged on two sides of the main body 81. For example, two connecting portions 82 are respectively located on opposite sides of the main body 81 in the direction x.

The accommodating portion of the fastener 80 is a through hole 821 that runs through the connecting portion 82, and the through hole 821 is disposed on the electrode terminal 5. In another embodiment of this application, an accommodating portion of the fastener 80 does not run through the connecting portion 82, but runs through a recessed cavity that has an opening in the connecting portion 82. The recessed cavity is disposed on the electrode terminal 5, meaning that part of the electrode terminal 5 is accommodated in the recessed cavity. However, for the convenience of description, the subsequent embodiments are described by using an example in which the accommodating portion of the fastener 80 is a through hole 821 that runs through the connecting portion 82.

The upper surface of the fastener 80 is provided with a first convex portion 822. The upper surface of the fastener 80 is a surface of the fastener 80 farther away from the battery cell 400, and the first convex portion 822 is arranged around the outside of the through hole 821. When the through hole 821 and the electrode terminal 5 are disposed together, the first convex portion 822 protrudes from the electrode terminal 5 in a direction leaving the battery cell 400. The first convex portion 822 is provided, so that other structural components installed on the upper part of the electrode terminal 5 can directly act on the first convex portion, thereby reducing forces acting on the electrode terminal 5 and preventing the electrode terminal 5 from deforming. This further ensures that the fastener installed on the electrode terminal 5 and the fire prevention pipeline 70 installed to the fastener 80 are installed stably, improving the safety performance of the battery.

The connecting portion 82 is also provided with a second convex portion 823. The second convex portion 823 protrudes from the fastener 80. When the through hole 821 is disposed together with the electrode terminal 5, the second convex portion 823 is close to the surface of the battery cell 400 and elastically abuts against the battery cell 400, to allow an assembly deviation between the fastener 80 and the battery cell 400. To be specific, the second convex portion 823 elastically abuts against the battery cell 400, so that the upper surfaces of the plurality of fasteners 80 can be in the same horizontal plane as far as possible, helping fasten the fire prevention pipeline 70 to the plurality of fasteners 80 at the same time.

As shown in FIG. 8 and FIG. 9, the connecting portion 82 is provided with a run-through accommodating hole 824 and a second convex portion 823. The second convex portion 823 includes a fixed portion 8231 and a protruding portion 8232. One end of the fixed portion 8231 is configured to connect to the protruding portion 8232, and the other end of the fixed portion 8231 is configured to connect to part of the walls of the accommodating hole 824. A gap is present between the protruding portion 8232 and other walls of the accommodating hole 824. When the fastener 80 is fastened to the battery cell 400, the protruding portion 8232 protrudes from the fastener 80 in a direction leaving the fire prevention pipeline 70, that is, the protruding portion 8232 protrudes from the fastener 80 and approaches a surface of the battery cell 400. The protruding portion 8232 is elastic, and is able to bend with respect to the fixed portion in a direction leaving the battery cell 400 when being subject to a force in the direction leaving the battery cell 400. The second convex portion 823 is elastic, so that the fastener 80 and the battery cell 400 are subject to balanced forces when the fastener 80 abuts against the battery cell 400, and assembly deviations are allowed between the fastener 80, the battery cell 400 and the fire prevention pipeline 70. This reduces the installation difficulty between the fastener 80, the battery cell 400 and the fire prevention pipeline 70.

In some feasible implementations, the quantity and position of the second convex portion 823 may be set according to the actual situation. For example, the second convex portion 823 is provided on the fastener 80 and placed between the fastener 80 and the battery cell 400. The plurality of second convex portions 823 are arranged in such positions that the fastener 80 and the battery cell 400 are subject to balanced forces when the fastener 80 abuts against the battery cell 400. For example, the plurality of second convex portions 823 may be symmetrically distributed around the through hole 821 or the plurality of second convex portions 823 are symmetrically distributed based on the main body 81, so that the fastener 80 and the battery cell 400 are subject to balanced forces when the fastener 80 abuts against the battery cell 400. Similarly, the second convex portion 823 may alternatively be a spring piece or other structures, as long as it is elastic and elastically abuts against the battery cell 400 and the fastener 80 to allow an assembly deviation between the fastener 80 and the battery cell 400.

The battery cell 400 is provided with a pressure relief mechanism 6. The pressure relief mechanism 6 is configured to be actuated when internal pressure or temperature of the battery cell 400 reaches a threshold, to release the internal pressure. The fire prevention pipeline 70 is configured to discharge the fire prevention medium toward the battery cell 400 when the pressure relief mechanism 6 is actuated. To avoid that the pressure relief mechanism 6 is blocked and the pressure relief mechanism 6 is unable to be spouted open, and also to allow the fire prevention medium discharged from the fire prevention pipeline 70 to enter the battery cell 400 through the pressure relief mechanism 6, the fastener 80 is further provided with a first weak zone 811, configured to allow the emissions from the battery cell 400 to pass through the first weak zone 811 and destroy the fire prevention pipeline 70 when the pressure relief mechanism 6 is actuated, so that the fire prevention medium in the fire prevention pipeline 70 passes through the first weak zone 811 to the battery cell 400.

The first weak zone 811 is provided on the main body 81. The first weak zone 811 is located above the pressure relief mechanism 6 and below the fire prevention pipeline 70, and the first weak zone 811 is provided opposite the pressure relief mechanism 6. To allow the fire prevention medium of the fire prevention pipeline 70 to pass through the pressure relief mechanism 6 and enter the battery cell 400 as much as possible to implement a good fire prevention on the battery cell 400 that experiences thermal runaway, a projected area of the fire prevention pipeline 70 on the first weak zone 811 is smaller than an area of the pressure relief mechanism 6.

In some feasible implementations, the first weak zone 811 may be directly provided as a through hole, or may be provided in a way other than a through hole. For example, a low-melting-point material is used on the first weak zone 811, or thickness of the first weak zone 811 is reduced, so that the first weak zone 811 has a lower strength, and is easily destroyed by the emissions to form a through hole when the pressure relief mechanism 6 is actuated.

Figure 5:
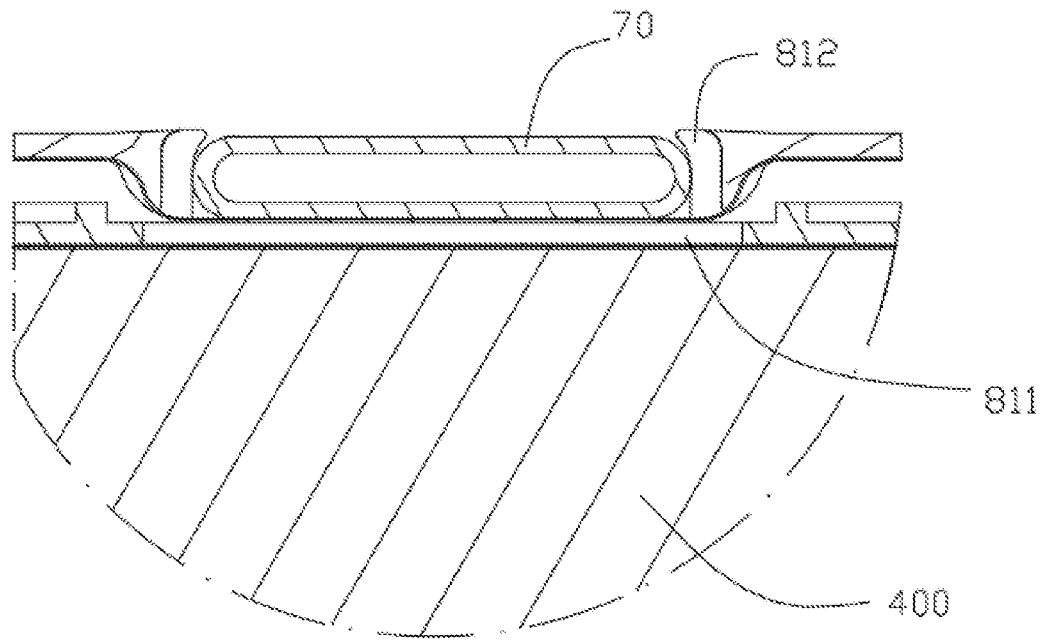
FIG. 5 is a cross-sectional view taken along the line B to B in FIG. 3.

In some feasible implementations, the first weak zone 811 may also be provided to accommodate overflowing fire prevention medium when the pressure relief structure 6 is actuated and the fire prevention medium flowing to the battery cell 400 overflows, to prevent the overflowing fire prevention medium from flowing into adjacent battery cells. As shown in FIG. 5, the first weak zone 811 is provided as a through hole, or a through hole is formed when the pressure relief mechanism 6 is actuated. Due to the thickness of the fastener 80, the through hole may become a accommodating pool for accommodating the fire prevention medium.

Figure 4:
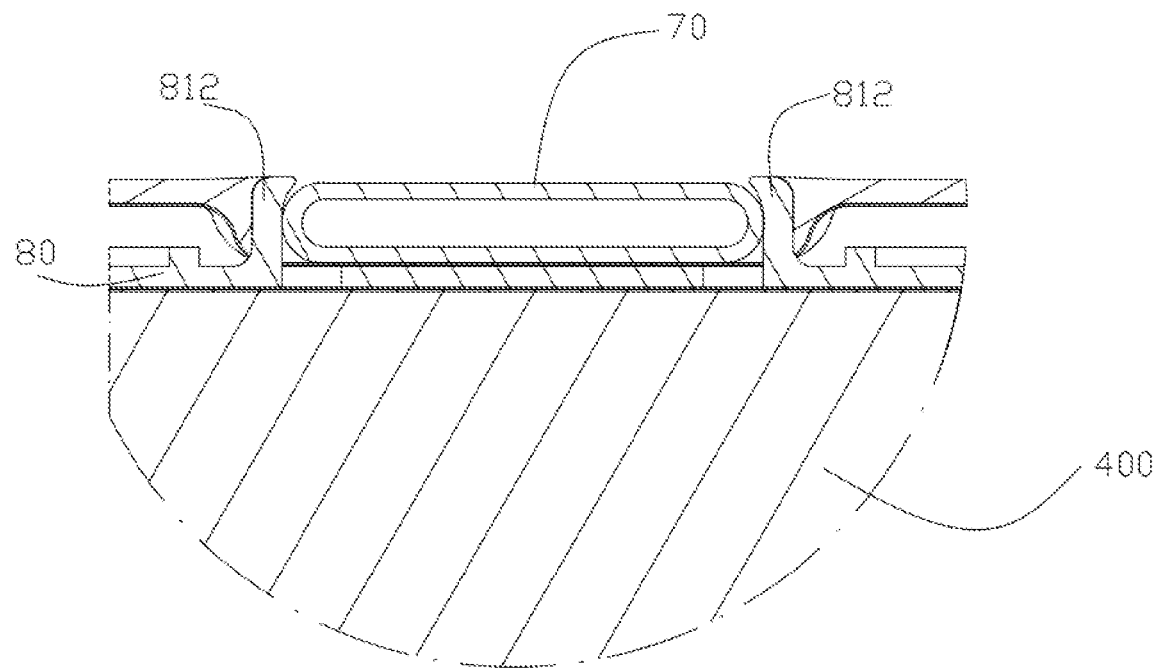
FIG. 4 is a cross-sectional view taken along the line A to A in FIG. 3.

The main body 81 of the fastener 80 is further provided with a buckle 812, which are provided on two sides of the first weak zone 811 along a central axis of the fire prevention pipeline 70, and are configured to fasten the fire prevention pipeline 70 to the fastener 80, as shown in FIG. 4. The buckles 812 are arranged and spaced apart from each other to fasten the fire prevention pipeline 70. In this way, processing technology can be simplified, and greater assembly deviations are allowed, helping assembly of the fire prevention pipeline 70 to the fastener 80.

The upper surface of the fastener 80, that is, a surface farther away from the battery cell 400, is provided with a stiffener structure 814. The main body 81 is further provided with a first depression, and the stiffener structure 814 of the main body 81 is provided on the outside of the first depression. The first weak zone 811 and the buckle 812 are both located in the first depression. The first depression can accommodate at least part of the fire prevention pipeline 70, for example, at least part of the bottom of the fire prevention pipeline 70.

In some feasible implementations, when the buckle 812 is located in the first depression, the buckle 812 and the first depression may form an accommodating pool for accommodating liquid. For example, when the pressure relief structure 6 is actuated, the first depression can be configured to block the emissions and fire prevention medium from flowing in the direction toward the electrode terminals 5 on two sides of the main body 81, and the buckle 812 can block the emissions and fire prevention medium from flowing along an axial direction of the fire prevention pipeline 70, to effectively prevent the emissions and fire prevention medium from entering adjacent battery cells.

In some embodiments, the fastener 80 may be a plastic part. The plastic part may be produced by integral injection molding at a high efficiency.

Through connection to the electrode terminal 5 of the battery cell 400, the fastener 80 in this embodiment not only fastens the fire prevention pipeline 70 to the battery cell, to control the battery cell 400 in thermal runaway in a timely manner and ensure the safe use of the battery, but also simplifies the installation of the fire prevention pipeline 70. In addition, the buckle 812, the first depression and the first weak zone 811 on the fastener 80 can form an accommodating pool to accommodate fluid, to prevent the emissions and fire prevention medium from flowing into the electrode terminal 5 and adjacent battery cells.

Figure 10:
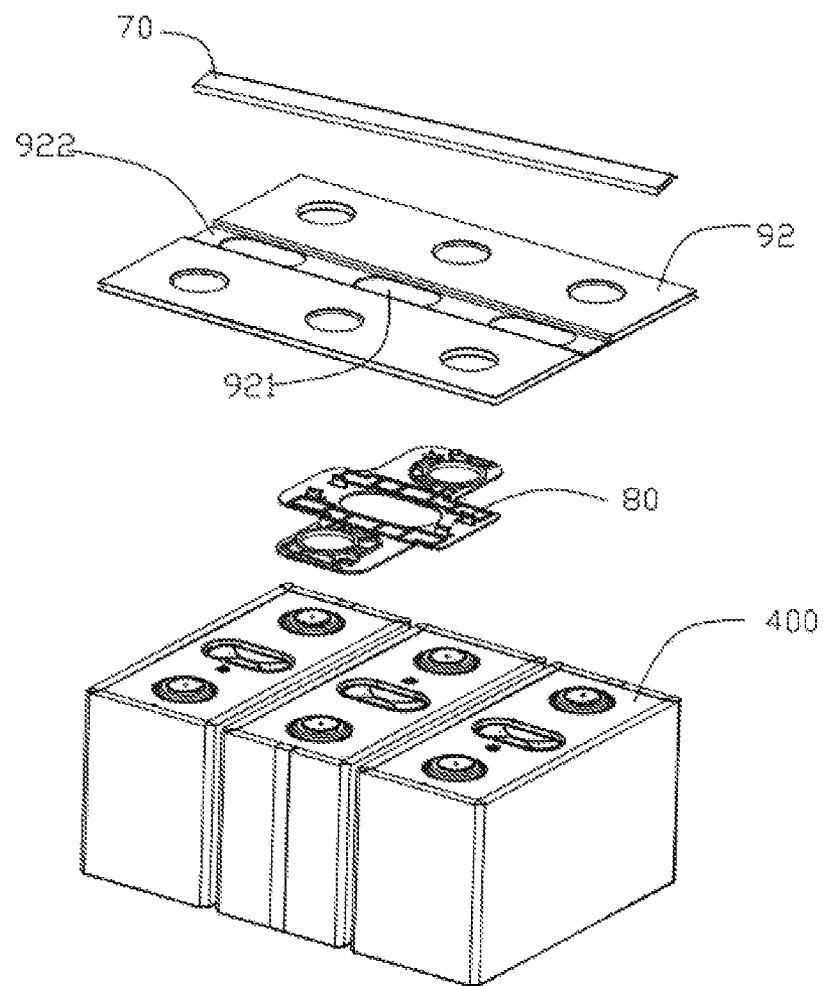
FIG. 10 is a schematic structural diagram of a fire prevention pipeline provided on a battery according to another embodiment of this application.

FIG. 10 is a schematic structural diagram of a fire prevention pipeline provided on a battery according to another embodiment of this application. The main difference between this embodiment and the foregoing embodiment is that the battery is further provided with a separation part 92.

In some feasible implementations, the separation part 92 is made of insulation materials with an effect of insulation.

The fastener 80 is provided between the separation part 92 and the battery cell 400, and part of the separation part 92 is located between the fastener 80 and the fire prevention pipeline 70.

In some feasible implementations, the separation part 92 is also configured for installing a busbar 91. The busbar 91 is connected to the electrode terminal 5, and the fastener 80 is located between the separation part 92 and the battery cell 400, to limit displacement of the fastener 80, or restrict the fastener 80 from moving in a direction leaving the battery cell 400.

To avoid that the position of the pressure relief mechanism 6 is blocked and the pressure relief mechanism 6 is unable to be spouted open, and also to allow the fire prevention medium discharged from the fire prevention pipeline 70 to enter the battery cell 400, the separation part 92 is also provided with a second weak zone 921, configured to allow the emissions from the battery cells to pass through when the pressure relief mechanism 6 is actuated, so that the fire prevention medium passes through the second weak zone 921 to destroy the fire prevention pipeline 70, and the fire prevention medium in the fire prevention pipeline 70 flows to the battery cell 400.

In some feasible implementations, the second weak zone 921 may be directly provided as a through hole, or may be provided in a way other than a through hole. For example, a low-melting-point material is used on the second weak zone 921, or thickness of the second weak zone 921 is reduced, so that the second weak zone 921 is destroyed by the emissions to form a through hole when the pressure relief mechanism 6 is actuated.

The separation part 92 is provided with a second depression 922. The second depression 922 is provided corresponding to the first depression, and the second weak zone 921 is provided in the second depression 922. A plurality of through holes are provided in the second depression 922. The through holes are provided on two sides of the second weak zone 921 along a central axis of the fire prevention pipeline 70. The buckle 812 of the fastener 80 passes through the through holes to fasten the fire prevention pipeline 70.

In some feasible implementations, the fire prevention pipeline 70 may be bonded to the separation part 92. For example, a structural adhesive may be used for bonding.

Figure 11:
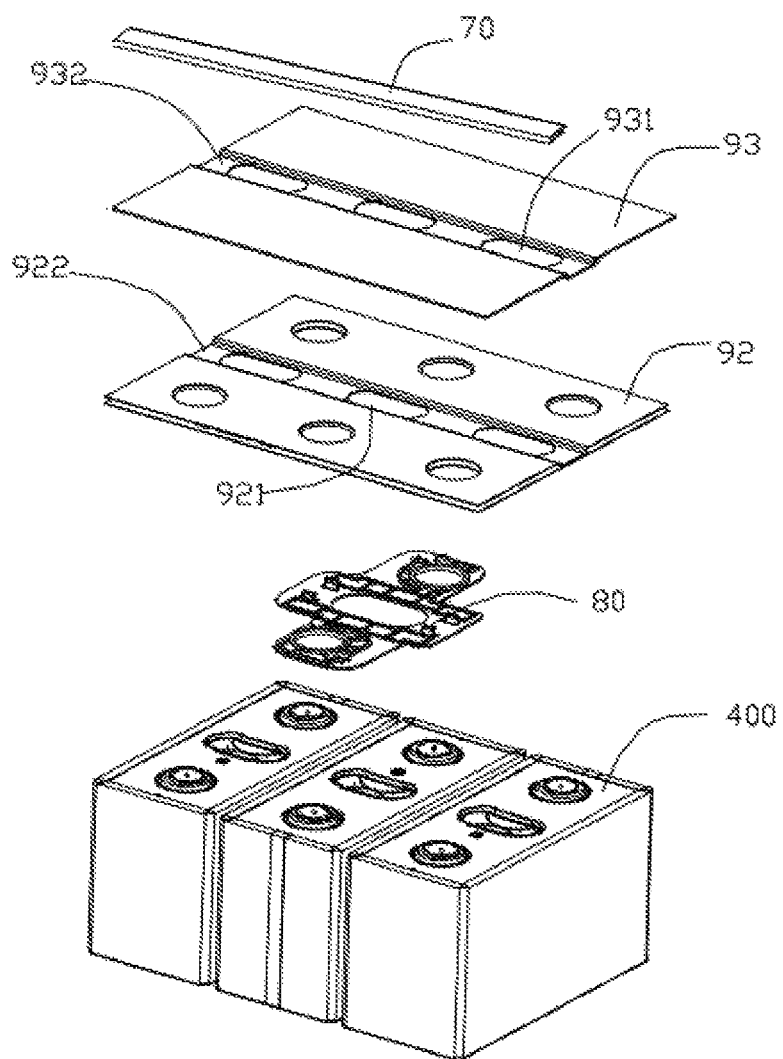
FIG. 11 is a schematic structural diagram of a fire prevention pipeline provided on a battery according to still another embodiment of this application.

FIG. 11 is a schematic structural diagram of a fire prevention pipeline provided on a battery according to still another embodiment of this application. The main difference between this embodiment and the foregoing embodiment is that the battery is further provided with a protection part 93.

In some feasible implementations, the protection part 93 may be made of an insulation material. For example, the protection part 93 may be a mica layer.

The protection part 93 is laid on the separation part 92 and covers the electrode terminal 5 to prevent the electrode terminal 5 from being short circuited by the emissions or fire prevention medium. The fire prevention pipeline 70 is located on the protection part 93.

To avoid that the position of the pressure relief mechanism 6 is blocked and the pressure relief mechanism 6 is unable to be spouted open, and also to allow the fire prevention medium discharged from the fire prevention pipeline 70 to enter the battery cell 400 to implement a good fire prevention, the protection part 93 is further provided with a third weak zone 931, configured to allow the emissions from the battery cells to pass through when the pressure relief mechanism 6 is actuated, so that the fire prevention medium passes through the third weak zone 931 to destroy the fire prevention pipeline 70, and the fire prevention medium in the fire prevention pipeline 70 flows to the battery cell 400.

In some feasible implementations, the third weak zone 931 may be directly provided as a through hole, or may be provided in a way other than a through hole. For example, a low-melting-point material is used on the third weak zone 931, or thickness of the third weak zone 931 is reduced, so that the third weak zone 931 is destroyed by the emissions to form a through hole when the pressure relief mechanism 6 is actuated.

The protection part 92 is provided with a third depression 932. The third depression 932 is provided corresponding to the first depression, and the third weak zone 931 is provided in the third depression 932. A plurality of through holes are further provided in the third depression 932, and the through holes are provided on two sides of the third depression 932 along a central axis of the fire prevention pipeline 70. The buckle 812 of the fastener 80 runs through the through holes to fasten the fire prevention pipeline 70. At the same time, the third depression 932 may accommodate the condensed water formed by cooling of the hot air in the box body on the fire prevention pipeline 70 and the fire prevention medium. The third depression 932 and the buckle 812 of the fastener 80 may form an accommodating pool above each battery cell 400, for preventing the emissions and fire prevention medium from flowing into the electrode terminal 5 and adjacent battery cells.

In some feasible implementations, the fire prevention pipeline 70 may be bonded to the protection part 93; or the protection part 93 and the separation part 92 are fastened together, and the fire prevention pipeline 70 is fastened only to the fastener 80.

In some feasible implementations, the position to which glue is applied bypasses the third weak zone 931 when the fire prevention pipeline 70 is being bonded to the protection part 93, so that the emissions is able to break through the third weak zone 931 successfully.

Figure 12:
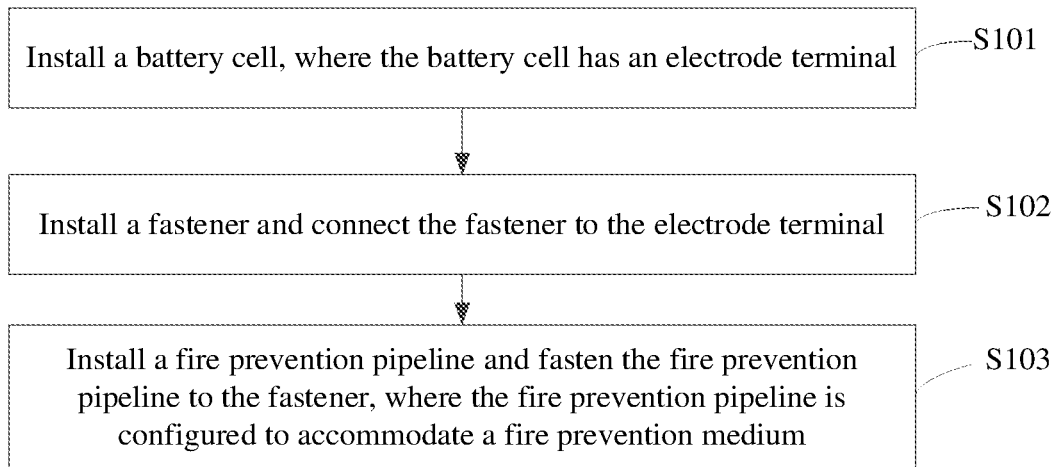
FIG. 12 is a flowchart of a method for preparing battery according to some embodiments of this application.

FIG. 12 is a flowchart of a method for preparing battery according to some embodiments of this application. The battery is the battery according to the foregoing embodiments. This method applies to a device for preparing battery.

S101. Install a battery cell, where the battery cell is provided with an electrode terminal.

S102. Install a fastener and connect the fastener to the electrode terminal.

S103. Install a fire prevention pipeline and fasten the fire prevention pipeline to the fastener, where the fire prevention pipeline is configured to accommodate a fire prevention medium.

According to this embodiment, during the installation process, the fastener is connected to the electrode terminal, to fasten the fire prevention pipeline by using the fastener. Compared with the conventional technology, the fire prevention pipeline is reliably fastened, and easy to install and operate.

Figure 13:
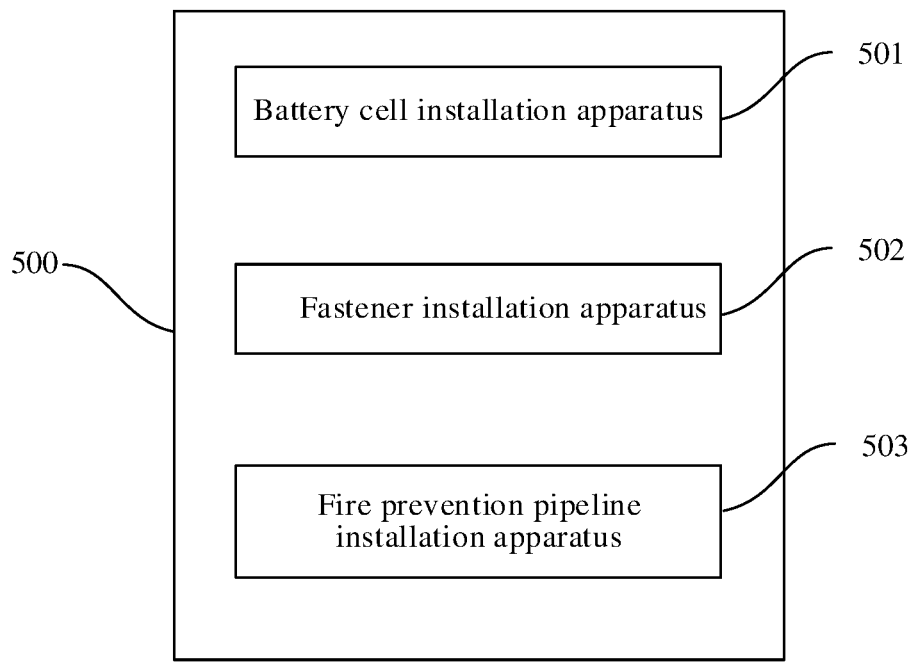
FIG. 13 is a schematic composition diagram of a device for preparing battery according to some embodiments of this application.

FIG. 13 is a schematic composition diagram of a device for preparing battery according to some embodiments of this application. The battery is the battery according to the foregoing embodiments. The device 500 for preparing battery includes: a battery cell installation apparatus 510, a fastener installation apparatus 520, and a fire prevention pipeline installation apparatus 530.

The battery cell installation apparatus 510 is configured to install a battery cell, where the battery cell is provided with an electrode terminal.

The fastener installation apparatus 520 is configured to install a fastener to fasten a fire prevention pipeline, and connect the fastener to the electrode terminal.

The fire prevention pipeline installation apparatus 530 is configured to install the fire prevention pipeline to the fastener, where the fire prevention pipeline is configured to accommodate a fire prevention medium.

The device for preparing battery in this embodiment can connect the fastener to the electrode terminal and fasten the fire prevention pipeline by using the fastener. Compared with the conventional technology, the fire prevention pipeline is reliably fastened, and easy to install and operate.

Mutual reference may be made between the foregoing protection topics of this application and the features in the embodiments. If the structure allows, persons skilled in the art can also flexibly combine the technical features in the different embodiments to form more embodiments.

The above describes in detail a battery, an electric apparatus, and a method and a device for preparing battery provided in this application. Specific embodiments are used in this specification to describe the principles and implementations of this application, and the descriptions of the above embodiments are merely used to help understand the methods and main ideas of this application. It should be noted that persons of ordinary skill in the art can make improvements and modifications to this application without departing from the principles of this application, and these improvements and modifications also fall within the protection scope of the claims of this application.

What is claimed is:

1. A battery, comprising:
    a battery cell with an electrode terminal;
    a fire prevention pipeline configured to accommodate a fire prevention medium; and
    a fastener configured to fasten the fire prevention pipeline, wherein the fastener is connected to the electrode terminal and comprises:
        an accommodating hole that runs through the fastener; and
        a second convex portion comprising:
            a fixed portion connected to a wall of the accommodating hole; and
            a protruding portion connected to the fixed portion, a gap being present between the protruding portion and the wall of the accommodating hole, and the protruding portion protruding from a surface of the fastener facing the battery cell and elastically abutting against the battery cell.

2. The battery according to claim 1, wherein the fastener further comprises an accommodating portion, the accommodating portion is configured to accommodate the electrode terminal, and the accommodating portion abuts against the electrode terminal to limit displacement of the fastener.

3. The battery according to claim 2, wherein the accommodating portion has an opening, and at least part of the electrode terminal is exposed through the opening.

4. The battery according to claim 2, wherein the accommodating portion is a through hole that runs through the fastener.

5. The battery according to claim 2, wherein the fastener further comprises a first convex portion, the first convex portion is around the periphery of the accommodating portion, and the first convex portion protrudes in a direction away from the battery cell.

6. The battery according to claim 1, wherein the second convex portion is configured to accommodate an assembly deviation between the fastener and the battery cell.

7. The battery according to claim 1, wherein the second convex portion is elastic.

8. The battery according to claim 1, wherein the protruding portion bends with respect to the fixed portion in a direction away from the battery cell when the protruding portion is subject to a force in the direction away from the battery cell.

9. The battery according to claim 1, wherein the battery includes a plurality of second convex portions, and the plurality of second convex portions are arranged in positions that enable the fastener to receive a balanced force when the fastener abuts against the battery cell.

10. The battery according to claim 1, wherein the battery cell further comprises a pressure relief mechanism, and the pressure relief mechanism is configured to be actuated to release the internal pressure when an internal pressure or a temperature of the battery cell reaches a threshold;
   the fire prevention pipeline is configured to discharge the fire prevention medium toward the battery cell when the pressure relief mechanism is actuated; and
   the fastener is provided with a first weak zone, and the first weak zone is configured to allow the fire prevention medium to flow through the first weak zone to the battery cell when the pressure relief mechanism is actuated.

11. The battery according to claim 10, wherein the first weak zone is a through hole; or
   the first weak zone is configured to form a through hole when the pressure relief mechanism is actuated.

12. The battery according to claim 10, wherein the fastener further comprises a buckle, the buckle is configured to fasten the fire prevention pipeline to the fastener, and the buckle is provided on two sides of the first weak zone along a central axis of the fire prevention pipeline.

13. The battery according to claim 12, wherein the fastener further comprises a first depression, configured to accommodate at least part of the fire prevention pipeline, and the first weak zone and the buckle are both provided in the first depression.

14. The battery according to claim 10, wherein the battery further comprises a separation part, configured for installing a busbar, the busbar is connected to the electrode terminal, and the fastener is located between the separation part and the battery cell to limit displacement of the fastener.

15. The battery according to claim 14, wherein the separation part comprises a second weak zone, configured to allow emissions of the battery cell to pass through the second weak zone and destroy the fire prevention pipeline when the pressure relief mechanism is actuated.

16. An electric apparatus, comprising the battery according to claim 1, wherein the battery is configured to supply electrical energy.

17. A method for manufacturing batteries, comprising:
   installing a battery cell, wherein the battery cell has an electrode terminal;
   installing a fastener and connecting the fastener to the electrode terminal, wherein the fastener comprises:
      an accommodating hole that runs through the fastener; and
      a second convex portion comprising:
         a fixed portion connected to a wall of the accommodating hole; and
         a protruding portion connected to the fixed portion, a gap being present between the protruding portion and the wall of the accommodating hole, and the protruding portion protruding from a surface of the fastener facing the battery cell and elastically abutting against the battery cell; and
   installing a fire prevention pipeline and fastening the fire prevention pipeline to the fastener, wherein the fire prevention pipeline is configured to accommodate a fire prevention medium.

18. A device for manufacturing batteries, comprising:
   a battery cell installation apparatus, configured to install a battery cell, wherein the battery cell has an electrode terminal;
   a fastener installation apparatus, configured to install a fastener and connect the fastener to the electrode terminal, wherein the fastener comprises:
      an accommodating hole that runs through the fastener; and
      a second convex portion comprising:
         a fixed portion connected to a wall of the accommodating hole; and
         a protruding portion connected to the fixed portion, a gap being present between the protruding portion and the wall of the accommodating hole, and the protruding portion protruding from a surface of the fastener facing the battery cell and elastically abutting against the battery cell; and
   a fire prevention pipeline installation apparatus, configured to install a fire prevention pipeline to the fastener, wherein the fire prevention pipeline is configured to accommodate a fire prevention medium.

19. The battery according to claim 1, wherein the fastener further comprises:
   a main body; and
   two connecting portions located on opposite sides of the main body in a first direction;
   wherein a size of each of the two connecting portions in a second direction perpendicular to the first direction is smaller than a size of the main body in the second direction.

* * * * *